UNITED STATES PATENT OFFICE.

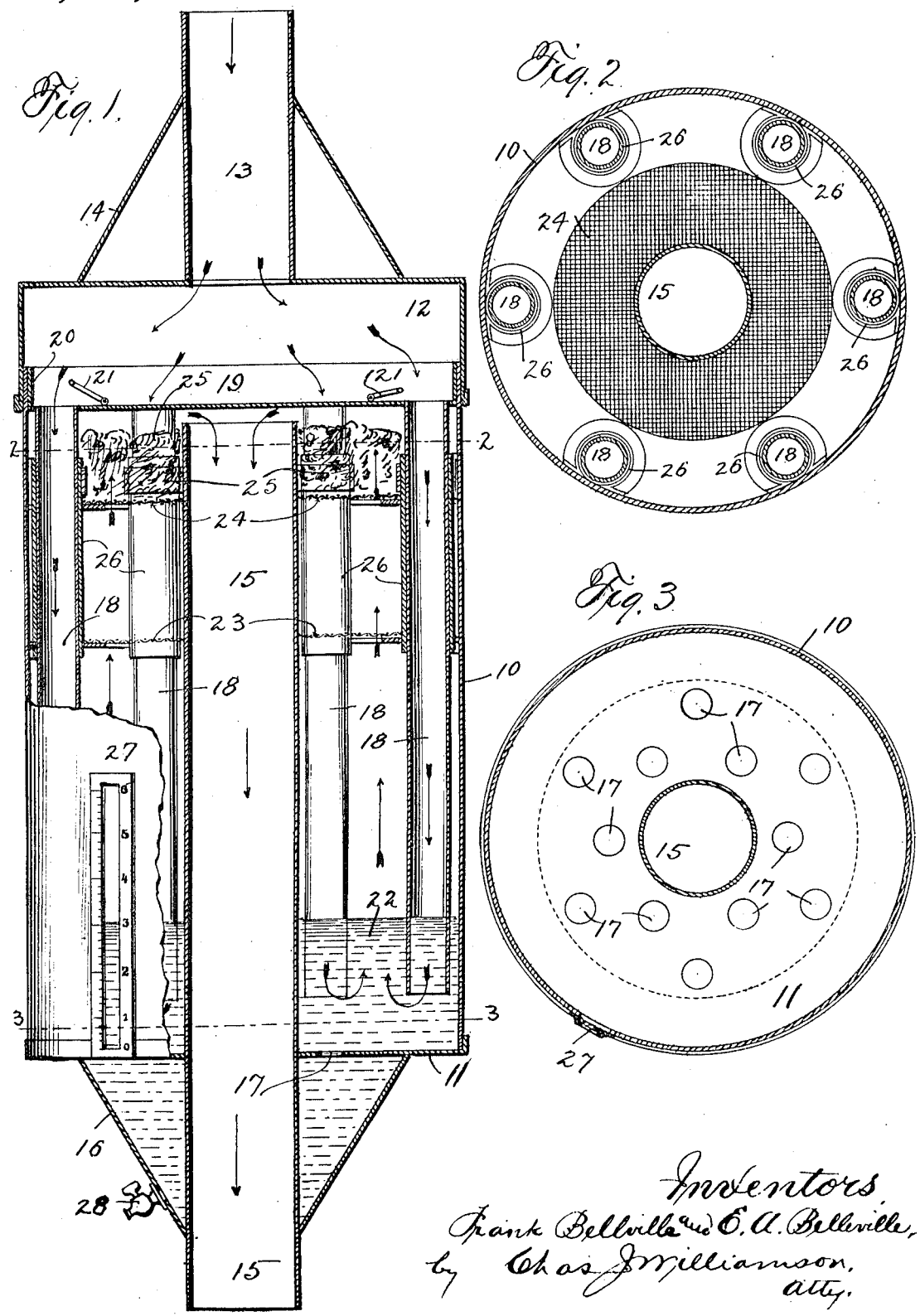
F. BELLVILLE AND E. A. BELLEVILLE.
AIR FILTER FOR GAS ENGINES.
APPLICATION FILED FEB. 11, 1919.
1,314,564. Patented Sept. 2, 1919.

FRANK BELLVILLE AND EDWIN A. BELLEVILLE, OF TWIN FALLS, IDAHO.

AIR-FILTER FOR GAS-ENGINES.

1,314,564.  Specification of Letters Patent.  Patented Sept. 2, 1919.

Application filed February 11, 1919. Serial No. 276,413.

*To all whom it may concern:*

Be it known that we, FRANK BELLVILLE and EDWIN A. BELLEVILLE, of Twin Falls, in the county of Twin Falls, State of Idaho, have invented a certain new and useful Improvement in Air-Filters for Gas Engines, and do hereby declare that the following is a full, clear, and exact description thereof.

It is important that air for mixing with gasolene in the carbureter of gas engines shall be freed from dust or fine grit, and especially is this the case in our western country where alkali dust is so abundant. Such dust or grit injures carbureters and finding its way into the engine, damages the cylinders and pistons causing enormous losses. Frequent reboring of the cylinders and replacement of the pistons becomes necessary, and the injury may be so serious as to necessitate wholly discarding the engine. Damage and loss from this cause are especially the case in farm tractors used in plowing because of the great quantity of dust they stir up. The object of our invention is the provision of an air filtering, or washing device of such construction that it will efficiently remove dust from air drawn into the gas engine, have a minimum of parts, so that it will be inexpensive to make and not get out of order, permit ready access to its interior for such cleaning as may be necessary or for other purposes, and yet be airtight when its parts are assembled and in working condition, and to this end our invention consists in the filter constructed substantially as hereinafter specified and claimed.

In the annexed drawings:

Figure 1 is a vertical section of a filter embodying our invention, partly in elevation;

Fig. 2 is a horizontal section on the line 2—2 of Fig. 1;

Fig. 3 is a horizontal section on the line 3—3 of Fig. 1.

In the apparatus shown in the drawings as one form or embodiment of our invention, we employ a cylindrical cup-like shell or container 10, with a fixed bottom 11, and a removable cover 12 in the form of an inverted cup, whose sides telescope over the sides of the shell 10 at the top and form an air tight joint therewith. At the center of the cover is a vertical pipe 13, that opens into the cover and is the air intake, by which the air is led into the container 10 at its upper end, and a flaring or conical skirt 14 surrounds the portion of the pipe adjacent to the cover, and being attached at its small end to the pipe and at its large end to the cover, forms a brace or support and provides a good finish at that end of the apparatus.

Within the shell or container 10, and concentric therewith, is a vertical pipe 15 that extends from the upper part of the container (but without reaching to the top thereof) through the bottom 11, and below the latter and leads to the carbureter (not shown) and which serves to deliver the air, after its treatment in the apparatus, to the carbureter. Surrounding the portion of the pipe 15 below the bottom 11, and attached thereto and to the bottom is a flaring or conical skirt 16 which braces or supports the pipe, and as there are holes 17 in said bottom 11, constitutes a prolongation or extension of the container 10.

Within the container 10, and reaching from the upper to the lower part thereof are several, equi-distant vertical tubes 18, arranged in a circular series concentric with the pipe 15, and lying close to the sides of the container. At their upper ends, said tubes are secured to a circular head 19 which at its rim has an upstanding flange 20 that closely fits the interior of the container, and said head, on its upper side, has one or more handles 21 (two as shown) in the form of loops pivoted thereto for folding flat against the head, out of the way, by which the head and attached tubes may be removed from the container 10. Air entering the container 10 at the top will encounter the head and flow over to the upper ends of the tubes, and will then flow down through the tubes and emerge therefrom at the bottom of the container, and into a body of water 22 in the lower part thereof in which the lower ends of the tubes are submerged. Passing through the water, the air will flow upward through the container, in the ample space between the tubes and the central pipe 15, and, after passing in succession, through a horizontal screen 23 of coarse mesh, and a second horizontal screen 24 of finer mesh, and a filtering body such as sponge 25 lying upon the second screen 24, will enter the upper end of the central eduction pipe 15, and will pass down through the pipe and on to the carbureter, and be delivered to the latter wholly freed from the dust or grit with which it was laden or charged at the time of entering the container 10 at the top. The water in the lower part of the container, besides serving to intercept dust passing into it with the air, provides enough moisture that is carried along with the air to keep the sponge in a moist dust-accumulating condition, and swelled to the desired volume to intercept the air in the upper part of the container.

For each of the raw air tubes, there is a tubular guide and support 26 attached to the inner wall of the container by which they are rigidly supported in proper position, despite the shocks and jars to which the apparatus, mounted on a motor car or tractor, is subjected.

To show the quantity of water in the lower part of the container, the side wall of the latter is provided with a glass gage 27; and for drawing off water or sediment, a pet cock 28 is connected with the conical skirt 16, at or near its lower end.

As we have before stated our invention is not limited to any particular form or shape of apparatus nor to the details of construction shown in the drawings, as many changes may be made by those skilled in the art which will involve no departure in principle.

What we claim is:

1. An air filter for gas engines, comprising a shell, having a removable cover at one end, an air intake opening through said cover, a head at such end spaced from such cover, and providing a chamber into which air enters from the intake, a plurality of tubes, extending from such head toward the other end of the shell, and opening into such chamber to take air therefrom, said head and said tubes being removable from the container, a pipe within the shell having an open end near such head, and passing through the shell and having an air outlet, and filtering media situated at intervals between the outlet ends of said tubes and the inlet end of said pipe, and including a porous body lying loose below said head and accessible when the shell cover and said head are removed.

2. An air filter for gas engines, comprising a shell having a removable cover at one end, an air intake opening through said cover, a head at such end spaced from such cover and providing a chamber into which air enters from the intake, a plurality of tubes, extending from such head toward the other end of the shell and opening into such chamber to take air therefrom, said head and said tubes being removable from the container, tubular guides for said tubes, attached to the inner wall of the container, a pipe within the shell having an open end near such head, and passing through the shell and having an air outlet, and filtering media situated at intervals between the outlet ends of said tubes and the inlet end of said pipe.

3. An air filter for gas engines, comprising a shell having a closed bottom and a removable cover, an intake pipe attached to and opening into the cover, a head having a flange slidingly fitting within the shell at the cover end thereof, a plurality of tubes attached at one end to said head and opening through the same, and lying adjacent the inner wall of the shell, the lower ends of said tubes reaching near to the bottom of the shell, a central pipe leading from near said head, downward through the shell and passing outward through the bottom thereof, and filtering media within the shell situated at intervals between the lower ends of the tubes and the upper end of said pipe.

In testimony that we claim the foregoing we have hereunto set our hands.

FRANK BELLVILLE.
EDWIN A. BELLEVILLE.